United States Patent
Meador et al.

(10) Patent No.: US 7,456,983 B2
(45) Date of Patent: Nov. 25, 2008

(54) SYSTEM AND METHOD FOR PREVENTING COMPREHENSION OF A PRINTED DOCUMENT

(75) Inventors: Jack L. Meador, Boise, ID (US); David J. Luman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 973 days.

(21) Appl. No.: 10/612,598

(22) Filed: Jul. 2, 2003

(65) Prior Publication Data

US 2005/0002053 A1 Jan. 6, 2005

(51) Int. Cl.
G06F 15/00 (2006.01)
(52) U.S. Cl. ...................................... 358/1.14; 358/1.1
(58) Field of Classification Search ................ 399/366; 283/902, 67, 94, 903, 114; 358/401, 1.14, 358/1.1; 355/201, 7, 52; 241/100
See application file for complete search history.

(56) References Cited

U.S. PATENT DOCUMENTS

| 447,077 | A | * | 2/1891 | Stringham ................... 403/43 |
|---|---|---|---|---|
| 3,650,226 | A | | 3/1972 | Conroy et al. |
| 3,781,109 | A | * | 12/1973 | Mayer et al. ................... 355/52 |
| 4,786,941 | A | * | 11/1988 | Regan ......................... 399/182 |
| 4,980,719 | A | * | 12/1990 | Allen et al. ..................... 399/3 |
| 5,184,849 | A | * | 2/1993 | Taylor ......................... 283/67 |
| 5,236,138 | A | | 8/1993 | Stangenberg et al. |
| 5,409,171 | A | | 4/1995 | Stangenberg et al. |
| 5,538,194 | A | * | 7/1996 | Stangenberg et al. ....... 241/100 |
| 5,542,710 | A | * | 8/1996 | Silverschotz et al. .......... 283/94 |
| 5,666,191 | A | * | 9/1997 | Hasegawa et al. ........... 399/366 |
| 5,681,065 | A | * | 10/1997 | Rua et al. ..................... 283/95 |
| 2002/0153721 | A1 | * | 10/2002 | Brooks et al. ............... 283/114 |
| 2003/0004607 | A1 | * | 1/2003 | Whaley ....................... 700/214 |
| 2005/0154582 | A1 | * | 7/2005 | Kortenoeven et al. ....... 704/200 |

OTHER PUBLICATIONS

Gary Stringham and Bert Newell☐☐An external output device for a printer that shreds paper when desired☐☐Published in Jul. 2001☐☐Research Disclosure Database No. 447077.*

* cited by examiner

*Primary Examiner*—King Y Poon
*Assistant Examiner*—Allen H Nguyen

(57) ABSTRACT

A method directed to preventing comprehension of a printed document. The method comprises feeding the printed document into a device having a printing mechanism, and printing, with the printing mechanism of over at least a portion of the printed document to prevent comprehension of the printed document.

8 Claims, 8 Drawing Sheets

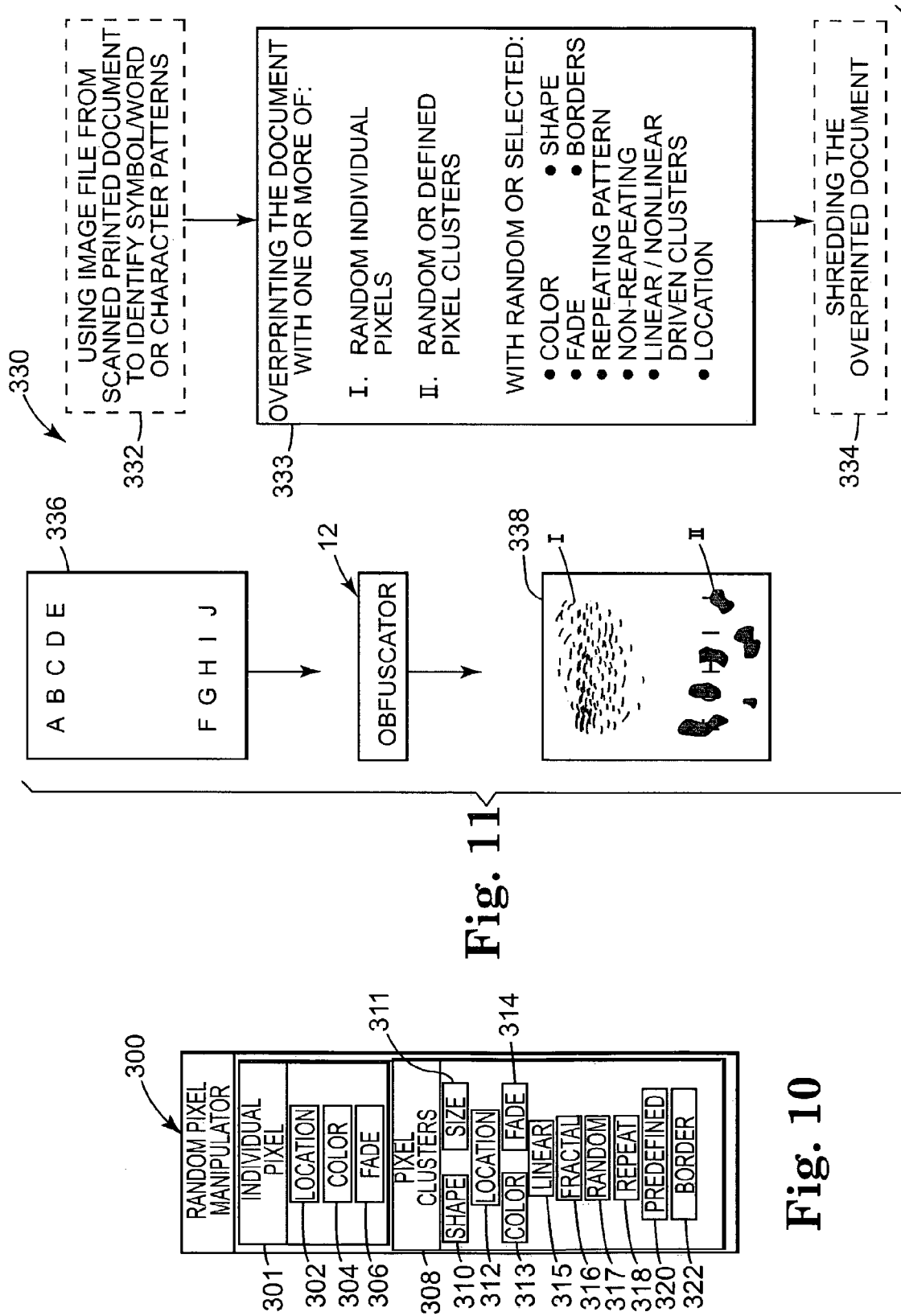

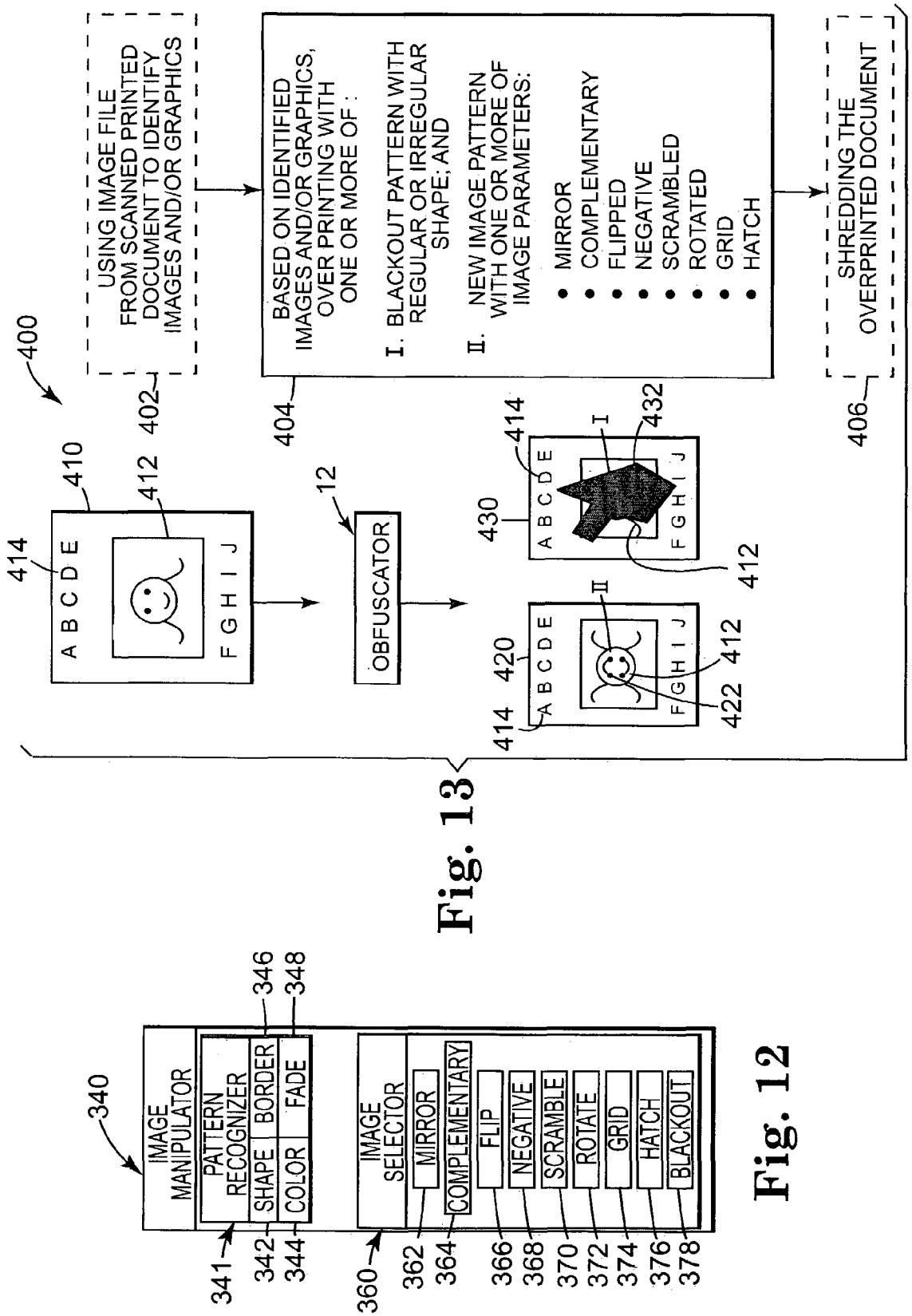

SYSTEM AND METHOD FOR PREVENTING COMPREHENSION OF A PRINTED DOCUMENT

BACKGROUND OF THE INVENTION

Responsible handling of printed information includes knowing when to make something available, and also knowing when and how to make it unavailable. Conventional means for destroying a document include incineration and shredding. However, highly motivated people can take a shredded document and painstakingly reassemble it to determine its original content.

Prior to the coming of the information age, particularly the last ten to twenty years, the need to destroy printed information was limited simply because there were fewer printed documents with private and confidential information. However, due to the ability of almost anyone with a computer and a printer to produce printed documents, there are more confidential documents than ever. In addition, with the proliferation of financial services and electronic transactions, there are many more financial documents circulating. Not surprisingly, there has been a rise in crime and trade secret espionage associated with obtaining this printed financial information and other printed information for use in criminal and/or commercially competitive activity.

Accordingly, with much at stake, and the willingness of criminals to snoop through trash, conventional shredding of documents is no longer an adequate measure to conclusively destroy documents.

SUMMARY OF THE INVENTION

A method of the present invention is directed to preventing comprehension of a printed document. The method comprises feeding the printed document into a device having a printing mechanism and then printing, with the printing mechanism over at least a portion of the printed document to prevent comprehension of the printed document. The method optionally further comprises shredding the overprinted document.

BRIEF DESCRIPTION OF THE DRAWINGS

FIG. 10 is block diagram of a random pixel manipulator of an overprint manager of a document obfuscator, according to an embodiment of the present invention.

FIG. 11 is a flow diagram of a method of obfuscating a printed document, according to an embodiment of the present invention.

FIG. 12 is block diagram of a image manipulator of an overprint manager of a document obfuscator, according to an embodiment of the present invention.

FIG. 13 is a flow diagram of a method of obfuscating a printed document, according to an embodiment of the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. Other embodiments may be utilized and structural or logical changes may be made without departing from the scope of the present invention. The following detailed description, therefore, is not to be taken in a limiting sense, and the scope of the present invention is defined by the appended claims. Although a flow chart in the figures of this application show a specific order of execution, the order of execution may differ from that what is depicted. All such variations are within the scope of the present invention.

Figure 1:
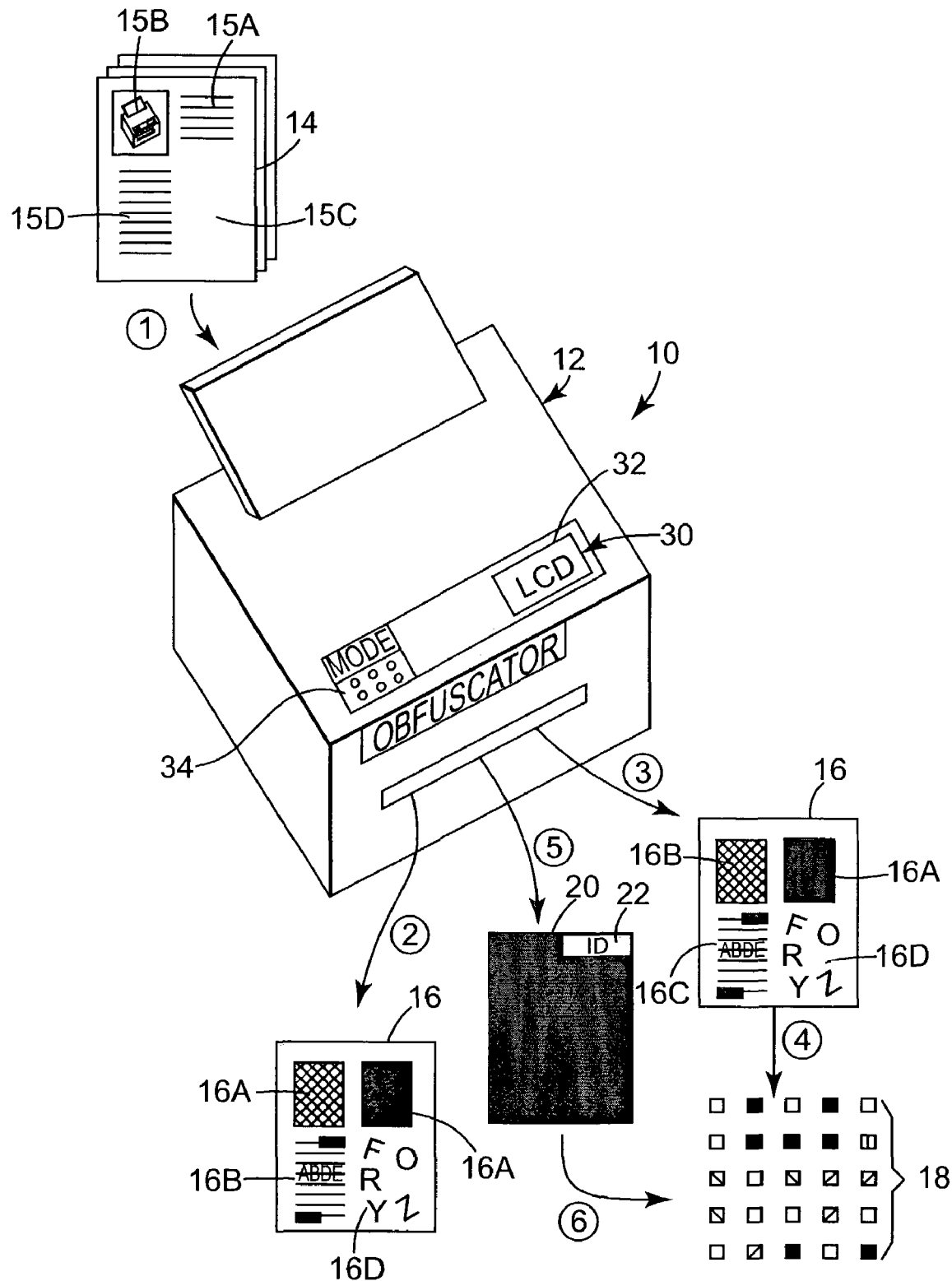
FIG. 1 is a schematic illustration of a method of obfuscating a printed document, according to an embodiment of the present invention.

As shown in FIG. 1, system 10 includes document obfuscator 12, printed document 14, and overprinted documents 16, 20. Document obfuscator 12 is capable of scanning and printing documents, and includes user interface 30 comprising display 32 and keypad 34. Printed document 14 includes text portion 15A, graphics portion 15B (including photographic and non-photographic images), and whitespace portion 15C.

Document obfuscator 12 is used in a method of the present invention of obfuscating documents, i.e. obscuring a face of the document, to prevent comprehension of the document. Obfuscating a document is helpful when a printed document contains sensitive or confidential information that needs to be protected. To obfuscate a document, one or more pages of printed document 14 are fed into document obfuscator 12, as shown by arrow 1, and document obfuscator 12 overprints ink or toner on top of printed document 14 to yield overprinted document 16. Overprinted document 16, shown by arrow 2 or 3, comprises printed document 14 with one or more patterns of ink or toner placed on top of text portion 15A, graphics portion 15B, and/or whitespace portion 15C of printed document 14 to prevent comprehension of that text portion 15A and/or graphics portion 15B.

As shown in FIG. 1, overprinted document 16 comprises blackout portion 16A, cross-hatch portion 16B, and overstrike portion 16C, and character misinformation portion 16D. Blackout portion 16A obscures text 15A of printed document 14, while crosshatch portion 16B obscures graphics 15B of printed document 14. Overstrike portion 16C obscures text 15D of printed document 14 while character misinformation portion 16D fills in whitespace 15C to obscure printed document 14. These overprinting schemes shown in FIG. 1 are merely examples of overprinting schemes of a method and system of the present invention.

The overprinting can be performed based on the content of printed document 14, or independent of the content of printed document 14. While overprinted document 16, as illustrated in FIG. 1, shows several arrangements of overprinting ink/toner on printed document 14, a single arrangement of overprinting may be used. Accordingly, several specific and distinct overprinting arrangements for obfuscating documents in association with obfuscator 12 will be described in greater detail in association with FIGS. 4-12.

To further insure that sensitive content on overprinted document 16 will not be comprehensible or recoverable, overprinted document 16 is optionally shredded, as shown by arrow 4, to produce a plurality of shredded document particles 18. The shredder can be part of document obfuscator 12 or embodied as a separate unit (not shown). Overprinting prior to shredding, according to a method of the present invention, eliminates printed visual cues that otherwise could be used to reconstruct a shredded document Accordingly, the combination of overprinting to obscure content on printed document 14 along with the shredding of overprinted document 16, insures that the content of printed document 14 will become virtually unrecoverable.

As shown by directional arrow 5 in FIG. 1, document obfuscator 12 also can produce overprinted document 20 which comprises a substantially complete blackout of ink or toner over printed document 14 to make the content of printed document 14 completely indecipherable. This step can be taken without any knowledge of the content and/or appearance of printed document 14.

To make recovery of overprinted document 20 even more difficult, as shown by arrow 6 of FIG. 1, overprinted document 20 also is optionally shredded by document obfuscator 12 (or a separate shredder).

Overprinted document 20 optionally retains identifier 22 (e.g. ID #) from printed document 14, or adds identifier 22 to printed document 14, for determining which printed document 14 was obfuscated. In that way, one can still prove possession of printed document 14, even though its contents are obscured.

As will be described in greater detail in association with FIGS. 2-13, document obfuscator 12 also includes other components to assist in effective obfuscation of printed document 14, such as a scanner for obtaining an image of printed document 14.

Figure 2:
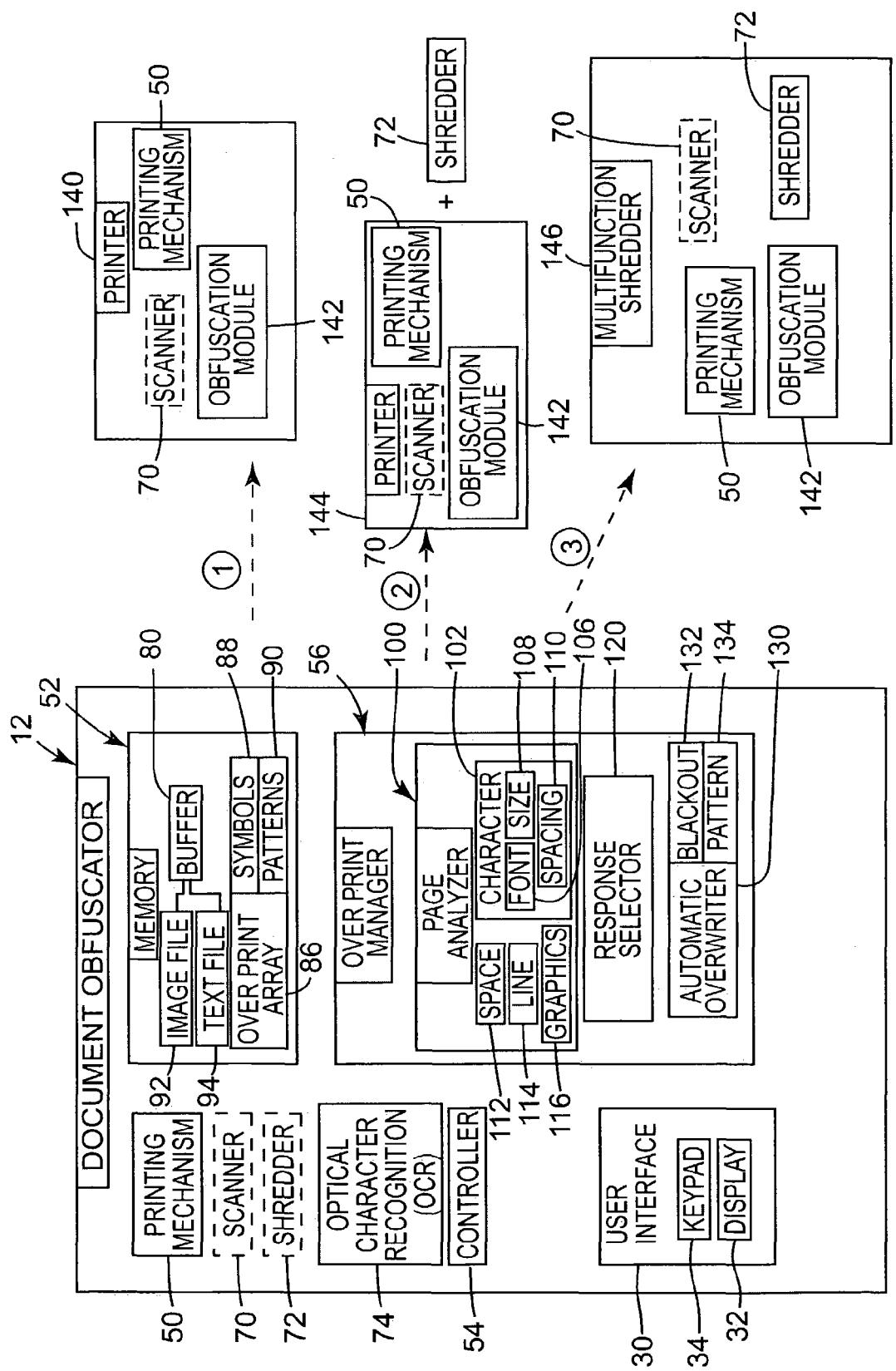
FIG. 2 is a block diagram of a document obfuscator, according to an embodiment of the present invention.

FIG. 2 illustrates document obfuscator 12 comprising user interface 30, printing mechanism 50, memory 52, controller 54, and overprint manager 56. Document obfuscator 12 also optionally comprises one or more of scanner 70, shredder 72, and optical character recognition (OCR) module 74.

User interface 30 of document obfuscator 14 is used to access and manage features of document obfuscator 12, including, overprint manager 56. Keypad 34 of user interface 30 permits entry of alphanumeric and/or symbolic characters to designate various functions of obfuscator, including specifying particular modes of obfuscation. Display 32 of user interface 30 shows results of use of keypad 34 and the status of functions and features of document obfuscator 12. Finally, features and attributes of document obfuscator 12, such as overprint manager 56, are also optionally accessible and managed through user interface 30 when user interface 30 is embodied in a computing device (not shown) connected to document obfuscator 12.

Printing mechanism 50 is an ink jet or laser printing mechanism for printing ink or toner onto paper, as directed by overprint manager 56. Printing mechanism 50 also comprises all conventional features for printing text, graphics, etc., including a printer driver for supporting those features.

Memory 52 holds image file(s) 92 and electronic text file(s) 94 and overprint array 86 including symbols 88 and patterns 90. Overprint array 86 contains symbols 88 (e.g. text characters and non-text characters/symbols) and patterns 90 (patterns of characters, graphics, etc.) for use by response selector 120 that are to be overprinted onto printed document 14 (FIG. 1). Overprint array 86 is used to implement different functions of document obfuscator 12 as explained in greater detail in association with FIGS. 4-13.

Image file 92 is a digital image file of printed document 14 (FIG. 1) obtained from scanner 70. Electronic text file 94 is a text file obtained via optical character recognition module 74, which converts digital image file 92, to a text-based format suitable for use by a word processor or text editor software program capable of determining the content of printed document 14 (FIG. 1). Image file 92 and/or electronic text file 94 is optionally used by overprint manager 56, to select an appropriate overprint response via response selector 120 to maximize effective obfuscation of printed document 14. Use of image file 92 and/or electronic text file 94 with response selector 120 is described in greater detail in association with FIGS. 4-13.

Buffer 80 of memory 52 acts as short term memory for holding data related to scanning printed document 14 (FIG. 1) and/or optical character recognition of image file 92 of printed document 14. Buffer 80 stores this data for a period of time just long enough to obfuscate printed document 14 into overprinted documents 16 (or 20), and then purges this data or instructs buffer 80 to permit overwriting of this data during the next use of buffer 80.

Memory 52 of obfuscator 12 comprises computer readable media, stores any related software, and can include any combination of volatile or non-volatile memory, such as floppy disks, hard disks, CD-ROMs, flash memory, read-only memory (ROM), and random access memory (RAM). Portions of memory 52, such as buffer 80, also optionally are embodied in an application specific integrated circuit (ASIC) residing within document obfuscator 12.

Buffer 80 is optionally embodied in an application specific integrated circuit (ASIC) within scanner 70 so that buffer 80 can store an image of each line of printed document 14 as it is scanned. Response selector 120 of overprint manager 56 can then optionally direct overprinting by document obfuscator 12 on a line-by line basis in response to the line-by-line data stored in buffer 80. This aspect of buffer 80 is optionally used with character negative function 212 of character manipulator 200 of document obfuscator 12, as described in more detail in association with FIG. 9.

Controller 54 of document obfuscator 12 directs operation of all components and functions of document obfuscator 12. Controller 54 preferably includes hardware, software, firmware or combination of these. In one preferred embodiment, controller 54 includes a microprocessor-based system including memory for storing information. Alternatively, controller 54 is incorporated into an application specific integrated circuit (ASIC) which includes hardware, software, and/or firmware and which optionally includes optical character recognition module 74.

Scanner 70 optically obtains digital image 92 of printed document 14 (FIG. 1) using technology well known in the art. Shredder 72 mechanically separates printed document 14 into a plurality of paper particles, strips, squares, etc. so that it is difficult to handle and comprehend printed document 14. Optical character recognition module 74 (OCR 74) cooperates with controller 54 to convert digital image file 92, obtained from scanner 70, into electronic text file 94.

Overprint manager 56 of document obfuscator 12 includes page analyzer 100, response selector 120, and automatic overwriter 130. Page analyzer 100 is used in association with scanner 70 (which obtains image file 92 of printed document 14) to examine the contents of printed document 14 and/or appearance of printed document 14 (e.g., the spatial arrangement of characters, symbols, graphics, whitespace, etc.) to determine how best to apply overprinting to obfuscate printed document 14.

Page analyzer 100 includes character function 102 including font function 106, size function 108, and spacing function 110, as well as whitespace function 112, line function 114, and graphics function 116. Character function 102 identifies and examines the font, size, and spacing of text or symbol characters on printed document via font function 106, size function 108, and spacing function 110, respectively. Whitespace function 112 identifies and tracks the quantity and location of whitespace 15C on printed document 14 (FIG. 1), which is space that does not have any ink or toner on printed document 14. Line function 114 identifies and tracks the number, length, and location of text lines (e.g., text 15A, 15D in FIG. 1) on printed document 14. Graphics function 116 identifies and tracks the location, size, and pattern of any graphics, images, pictures, photographs, drawings, etc., (e.g., graphics portion 15B in FIG. 1) on printed document 14.

Response selector 120 of overprint manager 56 automatically selects, or permits a user to select, an overprint pattern in response to the content and/or recognized symbols and patterns of printed document 14, which are identified by page analyzer 100 of overprint manager 56 (see FIG. 2). Response selector 120 includes a plurality of modules directed to particular aspects of overprinting and may include one or more components comprising character manipulator 200 (FIGS. 4-5), symbol pattern manipulator 240 (FIGS. 6-7), word manipulator 280 (FIGS. 8-9), random pixel manipulator 300 (FIGS. 10-11), and image manipulator 340 (FIGS. 12-13). Response selector 120, including its components and functions (200, 240, 280, 300, 340), is described in more detail in association with FIGS. 4-13.

Overprint manager 56 also includes automatic overwriter module 130 configured for automatically overprinting a printed document with blackout mode 132 or pattern mode 134. For example, overprinted document 20 as shown in FIG. 1 is produced by automatic overwriter module 130 in blackout mode 132, since overprinting ink or toner over substantially the entire surface of printed document 14 can be done independently (i.e., without regard for) the content of printed document 14. As will be described in association with FIG. 10, overprinting in pattern mode 134 also can be performed without knowledge of the contents or symbol patterns of printed document 14. In particular, pattern mode 134 includes randomly overprinting patterns of pixels or pixel clusters (via random pixel manipulator 300 in FIG. 10) on printed document 14, as well as overprinting predefined patterns.

Document obfuscator 12 includes a device having a printing mechanism and can be embodied in a variety of formats, including a printer, a shredder, a multifunction printer, an all-in-one device, as well as a stand alone document obfuscator. In one arrangement, as shown by directional arrow 1 in FIG. 2, document obfuscator 12 is optionally expressed as printer 140 having printing mechanism 50, obfuscation module 142, and an optional scanner 70, as well as any implementing functions such as user interface 30 and controller 54. Obfuscation module 142 includes all features of document obfuscator 12 that are appropriate for embodying document obfuscator 12 in printer 140 including but not limited to memory 52 and overprint manager 56. In its simplest aspect, obfuscation module 142 comprises a printer driver including overprint manager 56. When optional scanner 70 is incorporated in printer 140, then printer 140 also optionally includes optical character recognition module 74.

In another arrangement, as shown by directional arrow 2 in FIG. 2, document obfuscator 12 also is optionally expressed as printer 144 and shredder 72. In this arrangement, printer 144 includes printing mechanism 50, obfuscation module 142 and optional scanner 70, as well as any implementing functions such as user interface 30 and controller 54. Obfuscation module 142 includes all features of document obfuscator 12 that are appropriate for embodying document obfuscator 12 in printer 144, including but not limited to memory 52 and overprint manager 56. In its simplest aspect, obfuscation module 142 comprises a printer driver including overprint manager 56. Shredder 72 is optionally used with printer 144 for shredding any documents overprinted by document obfuscator module 152.

In another arrangement, as shown by directional arrow 3 in FIG. 2, document obfuscator 12 also is optionally expressed as multifunction shredder 146 and includes shredder 72, printing mechanism 50, obfuscation module 152, and optional scanner 70, as well as any implementing functions such as user interface 30 and controller 54. Obfuscation module 142 includes all features of document obfuscator 12 that are appropriate for embodying document obfuscator 12 in multifunction shredder 146, particularly including memory 52 and overprint manager 56. In its simplest aspect, obfuscation module 142 comprises a printer driver including overprint manager 56. In this arrangement, any document overprinted via obfuscation module 142 of multifunction shredder 146 is then shredded by shredder 72 to insure that printed document 14 will no longer be comprehensible or recoverable.

Figure 3:
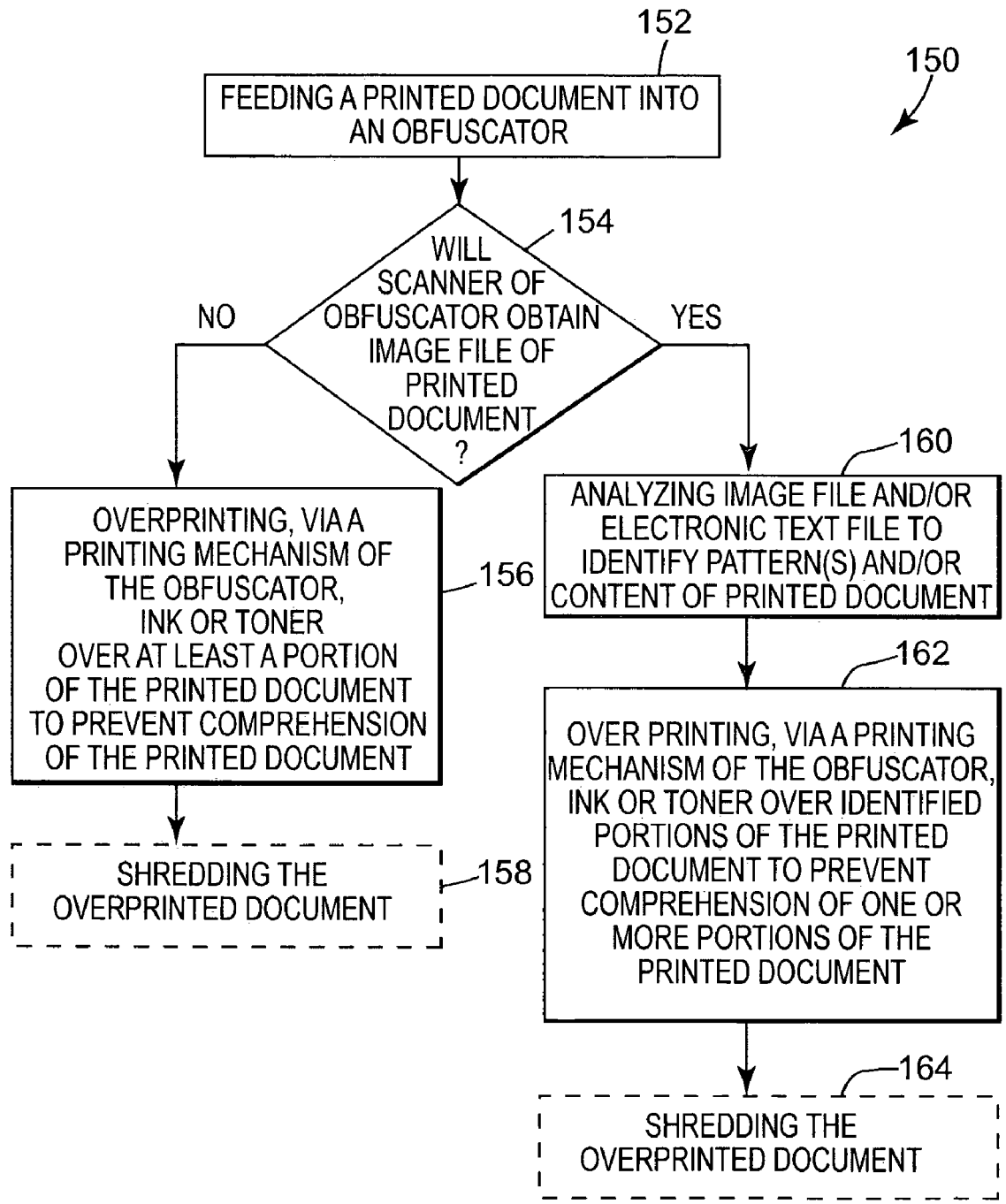
FIG. 3 is a flow diagram of a method of obfuscating a printed document, according to an embodiment of the present invention.

A method 150 of the present invention for obfuscating printed documents is shown in FIG. 3. As illustrated at 152, method 150 includes feeding a printed document into a document obfuscator 12, such as a printer. Method 150 further includes determining whether a scanner of document obfuscator 12 will obtain an image file of printed document 14 (illustrated at 154), as directed by the user via user interface 30. If this query is answered affirmatively, method 150 includes analyzing image file 92 and/or electronic text file 94 from scanner 70 to identify an appearance (e.g., symbols and patterns) and/or content of printed document 14 (as illustrated at 160). Method 150 then includes overprinting (via printing mechanism 50 of document obfuscator 12) ink or toner over identified portions of printed document 14 to prevent comprehension of one or more portions of printed document 14 (as illustrated at 162). Accordingly, this pathway of method 150 takes into account the content or appearance of text, symbols, and patterns on printed document 14. This pathway, therefore, permits selectively applying toner only to areas necessary to achieve obfuscation of printed document 14, so that less toner is used than if a complete blackout were applied to printed document 14 (e.g., as in overprinted document 20 in FIG. 1).

Overprinting printed document 14 is optionally followed by shredding overprinted document 16, as illustrated at 164. If the query illustrated at 154 is answered negatively, then method 150 includes overprinting (via printing mechanism 50 of document obfuscator 12) toner or ink over at least a portion of printed document 14, independent of the content or appearance of printed document 14, to prevent comprehension of printed document 14 (as illustrated at 156). Overprinting of printed document 14 is followed by optionally shredding overprinted document 16 (as illustrated at 158) to further prevent comprehension of printed document 14.

In one arrangement of method 150, overprint manager 56 uses image file 92 of printed document 14 (obtained from scanner 70) to recognize whitespace (e.g., whitespace portion 15C in FIG. 1) and printed space (e.g., text portion 15A in FIG. 1) on printed document 14 and then directs printing mechanism 50 to overprint ink or toner onto printed text portion(s) 15A and not onto whitespace portion(s) 15C. This saves costs and environmental resources since the entire printed document 14 need not be overprinted with ink or toner.

FIGS. 4-13 illustrate various components of response selector 120 of overprint manager 56 of document obfuscator 12.

Figure 5:
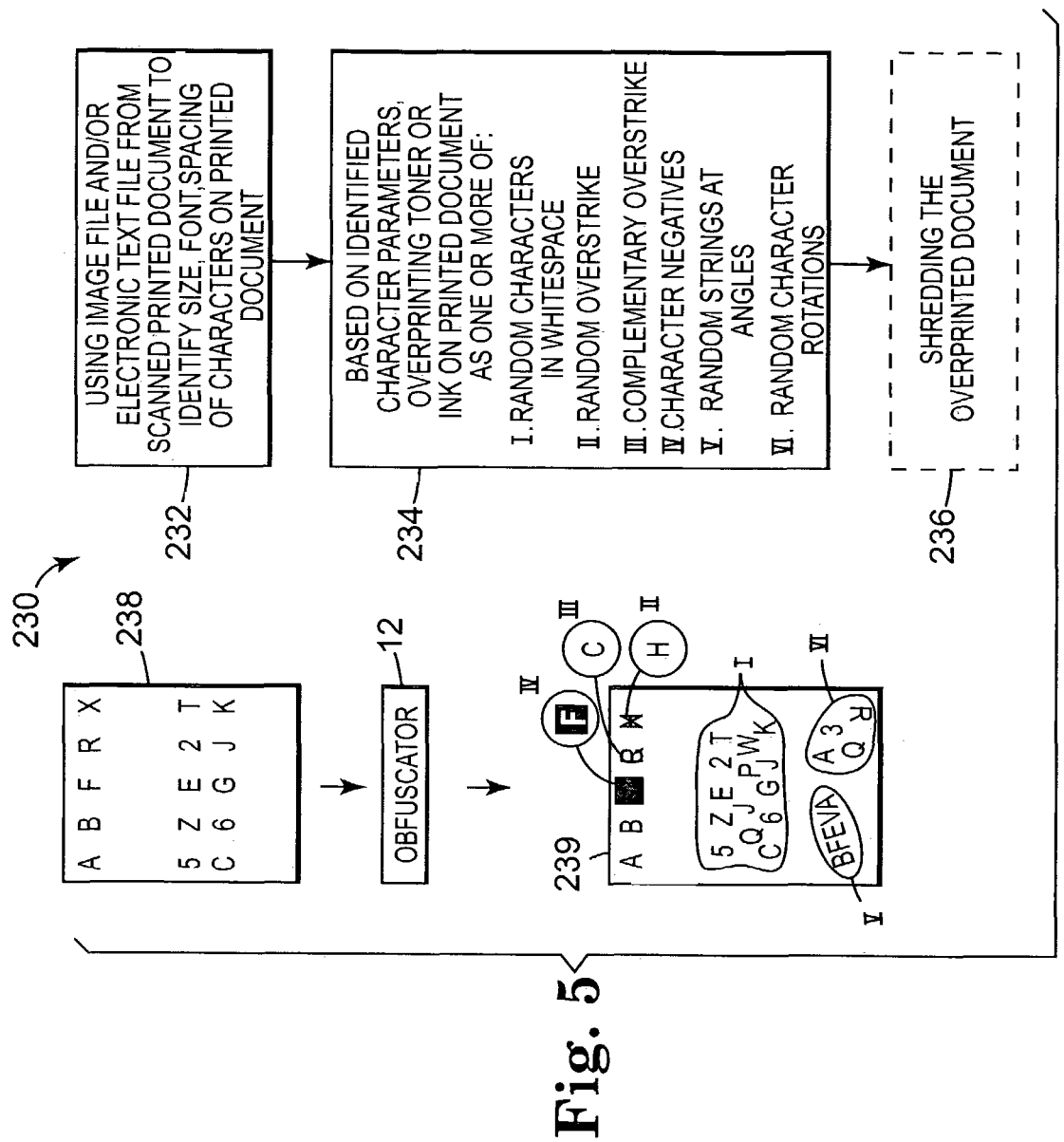
FIG. 5 is a flow diagram of a method of obfuscating a printed document, according to an embodiment of the present invention.
Figure 4:
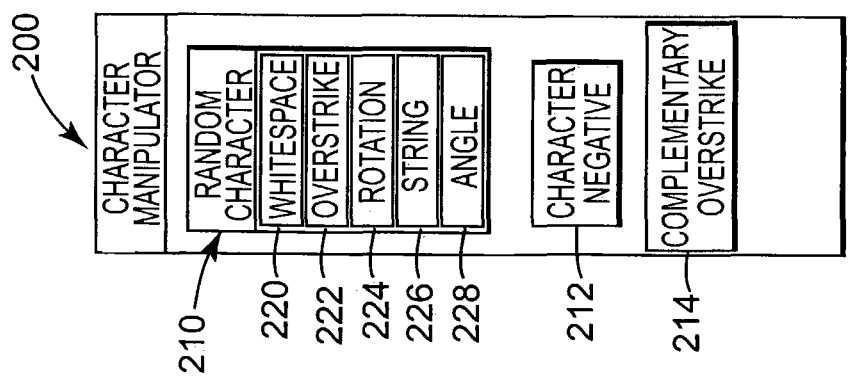
FIG. 4 is block diagram of a character manipulator of an overprint manager of a document obfuscator, according to an embodiment of the present invention.

FIG. 4 illustrates character manipulator 200 of the present invention, which is one optional component of response selector 120 of overprint manager 56 of document obfuscator 12. Character manipulator 200 is used, along with method 230 of the present invention, to obfuscate printed document 238 (FIG. 5). Character manipulator 200 acts to obfuscate printed document 238 based on parameters of characters identified in printed document 14 via scanner 70 and page analyzer 100.

Character manipulator 200 includes random character function 210, character negative function 212 and complementary overstrike function 214. Random character function 210 includes whitespace function 220, overstrike function 222, rotation function 224, string function 226, and angle function 228. Random character function 210 applies overprinting by using a resident font of document obfuscator 12 or a font that emulates a font of printed document 238. The emulated font is derived by examining the font of printed document 238 using page analyzer 100 of document obfuscator 12.

Whitespace function 220 generates overprinting of characters in whitespace of printed document 238, while overstrike function 222 generates overprinting of characters on top of identified characters in printed document 238. Overprinting characters onto whitespace of printed document 14 creates misinformation that hinders reconstruction of a shredded printed document. The misinformation makes it difficult to identify (from looking at the shredded particles) where paragraphs of printed document 14 had started and ended.

Rotation function 224 generates overprinting of characters that are rotated relative to identified characters of printed document 238. String function 226 generates strings of characters for overprinting onto whitespace and/or characters of printed document 238. Angle function 228 generates overprinting of one or more characters at angle (e.g., 0-180) relative to the orientation of identified characters of printed document 238.

Character negative function 212 generates overprinting in a pattern surrounding an identified character of printed document 238 without laying ink or toner over the identified character, thereby causing an overprint of ink/toner that is shaped as a negative image of the identified character. The identified character and the character negative overprint together form a single layer of ink or toner. This arrangement prevents use of a topographical analysis on a complete blackout overprint (in which ink or toner is laid directly on top of the identified characters) to detect the original characters of printed document 238.

Character negative function 212 is optionally employed with buffer 80 stored in ASIC in scanner 70. In this arrangement, buffer 80 stores printed document 238 on line-by-line basis, tracking the pixel locations printed on each line of printed document 238 so that printing mechanism 50 can then overprint ink or toner on all of the pixel locations (for each line) that did not have ink or toner in printed document 238 to achieve printing of a negative image of the identified character(s).

Character negative function 212 can be used with one or more characters on printed document 238, with each distinct character requiring a distinct character negative overprint. Complementary overstrike function 214 generates overprinting of a character having a shape that maximizes confusion relative to an identified character on printed document 238 onto which the complementary character is overstriken. Characters used in complementary overstrike function 214 preferably are retrieved from a table of complementary matching characters in array 86 of memory 52. In other words, each identified character on printed document 238 will be overstriken with another character that is pre-selected in advance to maximize confusion with the identified character(s) of printed document 14.

One or more of these functions (220-228) of random character function 210 can be used simultaneously or on the same page. For example, characters can be simultaneously rotated and used to overstrike characters of printed document 238. In another example, a whole string of overprint characters can be printed at an angle relative to characters of printed document 238, with or without each character in the string rotated relative to each other. Similarly, functions and attributes of character negative 212 and/or complementary overstrike function 214 are optionally used in association with any or all functions of random character function 210.

As shown in FIG. 5, method 230 of the present invention is directed to overprinting printed document 238 via character manipulator 200 of document obfuscator 12 by printing characters over existing characters, or in whitespace on printed document 238. Method 230 includes using image file 92 and/or electronic text file 94 (obtained from scanning printed document 238) to identify various parameters of printed document 238 such as a size, font, and spacing of characters on printed document 238, as illustrated at 232. Based on the identified character parameters, method 230 includes overprinting toner or ink on printed document 238 as one or more of: (1) random characters in whitespace; (2) random overstrike; (3) complementary overstrike; (4) character negatives; (5) random strings at angles; and (6) random character rotations.

As illustrated at 236, method 230 optionally further includes shredding overprinted document 239 to further prevent recovery and comprehension of printed document 238.

FIG. 5 also further illustrates the operation of character manipulator 200 of document obfuscator 12 in method 230 of overprinting ink or toner on printed document 238 to yield overprinted document 239. Printed document 238 includes a pattern of characters including alphabetic letters and numbers. As marked by indicator I, overprinted document 239 includes random characters (e.g., "Q", "J", "P", "W") printed in whitespace between and around characters (e.g., "5 Z E 2 T" and "C 6 G J K") previously existing on printed document 238. As marked by indicator II, overprinted document 239 reflects operation of overstrike function 222 of random character function 210, which generates overprinting as random characters (e.g., "H") that are printed directly on top of existing characters (e.g., "X") of printed document 238. As marked by indicator III, overprinted document 239 reflects operation of complementary overstrike function 214 of random character function 210 which generates overprinting as complementary characters (e.g., "C") that are printed over existing characters (e.g., "R") of printed document 238. As marked by indicator IV, overprinted document 239 reflects operation of character negative function 212 of random character function 210 which generates overprinting as a character negative that is printed around the existing character (e.g., "F") of printed document 238. As marked by indicator V, overprinted document 239 reflects operation of string function 226 and angle function 228 of random character function 210 which generates overprinting as random strings of characters at angles (e.g., "BFEVA") on top of printed document 238. As marked by indicator VI, overprinted document 239 reflects operation of rotation function 224 of random character function 210 which generates overprinting as characters (e.g., "A", "Q", "3", "R") that are randomly rotated and printed on top of printed document 238. Finally, as indicated at 236 in method 230, overprinted document 239 also is optionally shredded to further prevent comprehension of printed document 238.

Figure 7:
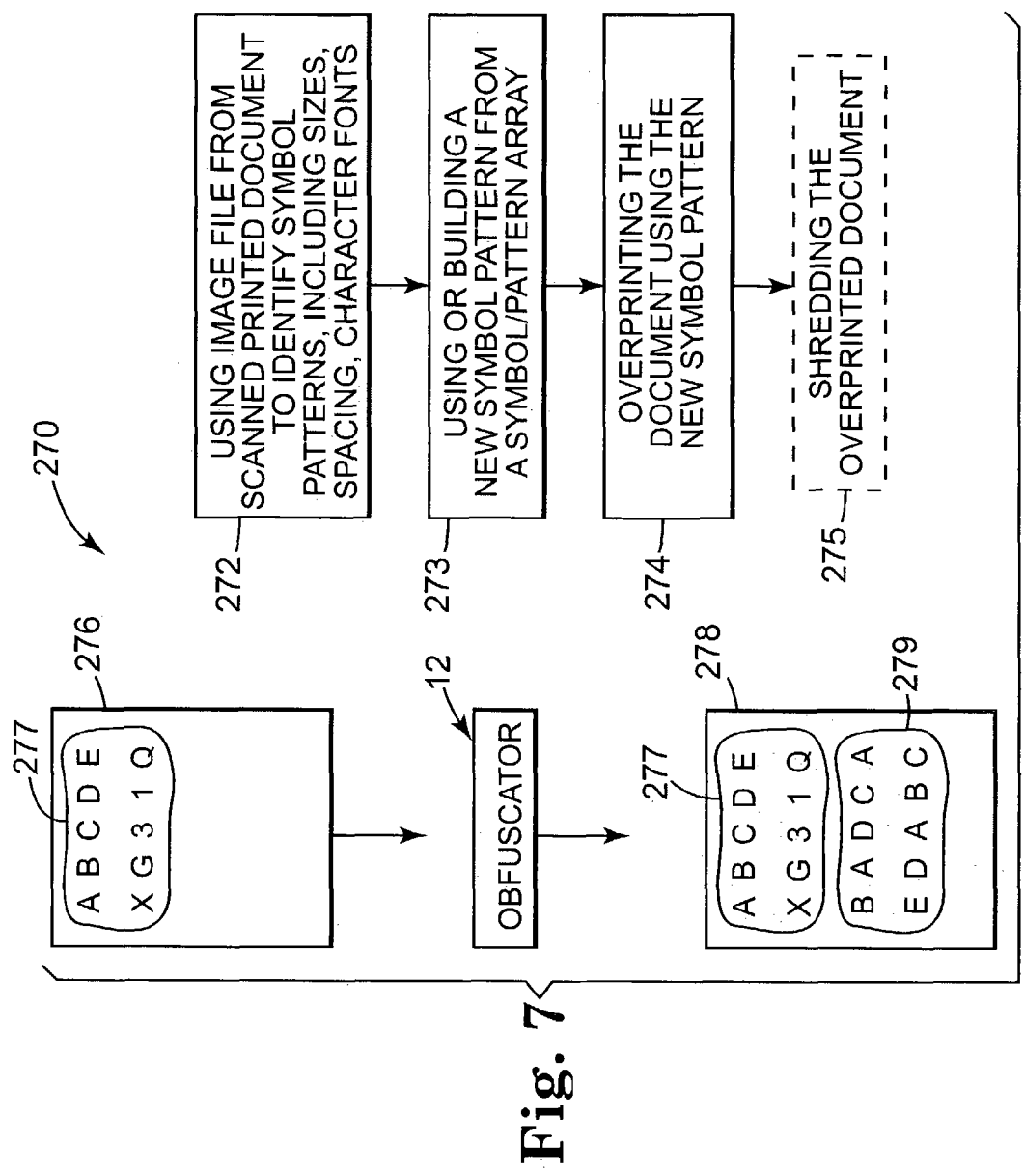
FIG. 7 is a flow diagram of a method of obfuscating a printed document, according to an embodiment of the present invention.
Figure 6:
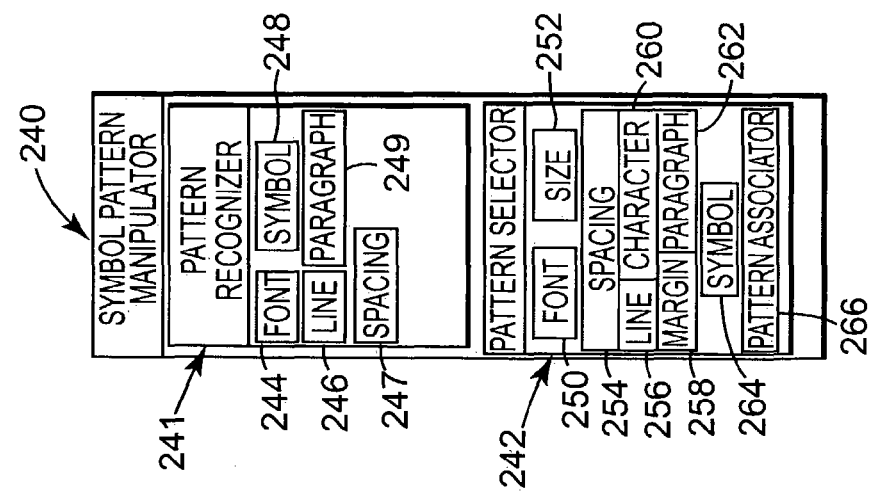
FIG. 6 is block diagram of a symbol pattern manipulator of an overprint manager of a document obfuscator, according to an embodiment of the present invention.

FIG. 6 illustrates symbol pattern manipulator 240 of the present invention, which is one optional component of response selector 120 of overprint manager 56 of document obfuscator 12. Pattern manipulator 240 is used, along with method 270 of the present invention, to obfuscate printed document 276 (FIG. 7).

As shown in FIG. 6, pattern manipulator 240 includes pattern recognizer 241 and pattern selector 242. Pattern recognizer 241 uses image file 92 and/or electronic text file 94 (obtained by scanning printed document 276 with scanner 70) to recognize patterns in text of printed document 276, particularly recognizing a font of the text as well as other parameters, such as spacing, symbols, paragraph placement, etc. Pattern recognizer 241 includes font function 244, line function 246, spacing function 247, symbol function 248, and paragraph function 249.

Pattern selector 242 includes font function 250, size function 252, spacing module 254 with line function 256, margin function 258, character function 260, and paragraph function 262. Pattern selector 242 also includes symbol function 264, and pattern associator 266.

Font function 244 of pattern recognizer 241 identifies the font of the text of printed document 276 while symbol function 248 identifies the type of symbols so that fonts and symbols used in overprinting emulate the appearance of fonts and symbols of printed document 276. Line function 246, spacing function 247, and paragraph function 249 identify parameters of lines (e.g., quantity, length, justification, etc.), parameters of spacing (e.g., space between characters within a line), and parameters of paragraphs (e.g., single, double spaced, paragraph separation, etc.) of printed document 276.

Based on information about printed document 276 determined from pattern recognizer 241, pattern selector 242 selects an overprint response that emulates the original font of printed document 276 based on the type of font, size of font, and spacing using font function 250, size function 252, and spacing function 254, respectively. Additional parameters of overprint response include selecting a margin, paragraph, and symbols of overprinted document 278 (FIG. 7), via margin function 256, paragraph function 262, and symbol function 264, respectively.

Pattern associator 266 takes all these individual characteristics of symbols, such as fonts, sizes, spacing, etc. and creates an overall pattern to be overprinted on printed document 276 that will maximize obfuscation of the existing pattern of ink or toner on printed document 276. In particular, pattern associator 266 introduces new unrelated information onto printed document 276 that appears as though it might be related to symbols and patterns of printed document 276. This misleading information interferes with reconstruction of a shredded printed document 276 that has been overprinted by substantially eliminating reassembly cues that are otherwise found in shredded particles, such as the original font, structure and meaning of printed document 276.

Moreover, more than one type of pattern can be recognized in printed document 276, which then allows using more than one pattern of overprinting to maximize obfuscation of printed document 276.

Pattern selector 242, in association with pattern associator 266, creates a table of overprint patterns 90 using choices from array 86 in memory 52.

FIG. 7 illustrates method 270 of the present invention for obfuscating printed document 276. Method 270 is directed to using image file 92 and/or electronic text file 94 (obtained by scanning printed document 276) and symbol pattern manipulator 240 to identify pattern 277 of symbols and texts, including sizes, spacing and character fonts, of printed document 276 as illustrated at 272. Method 270 includes using or building new symbol pattern 279 from a symbol/pattern array (such as array 86 of memory 52 in FIG. 1), as illustrated at 273, and overprinting the printed document using new symbol pattern 279 (as illustrated at 274). Method 270 optionally includes shredding the overprinted document, as illustrated at 275.

FIG. 7 also further illustrates operation of overprinting by pattern manipulator 240 in method 270 on printed document 276 to yield overprinted document 278. Overprinted document 278 reflects operation of symbol pattern manipulator 240, which generates overprinted pattern 279 of alphabetic and numeric characters which impedes comprehension of existing pattern 277 of characters of printed document 276. Accordingly, overprinted document 278 is optionally shredded, as illustrated at 275 in method 270, to further prevent comprehension of printed document 276.

Figure 9:
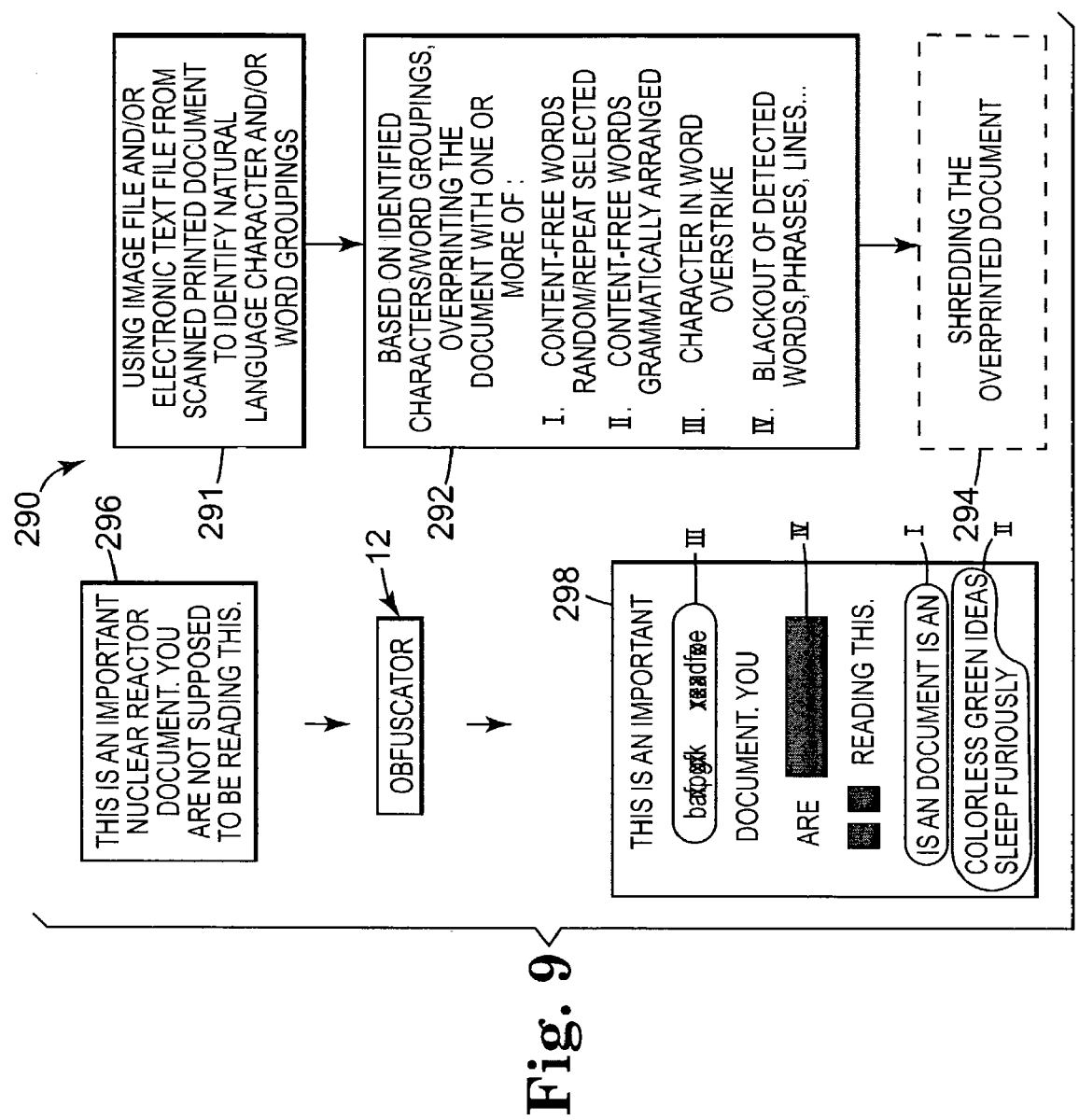
FIG. 9 is a flow diagram of a method of obfuscating a printed document, according to an embodiment of the present invention.
Figure 8:
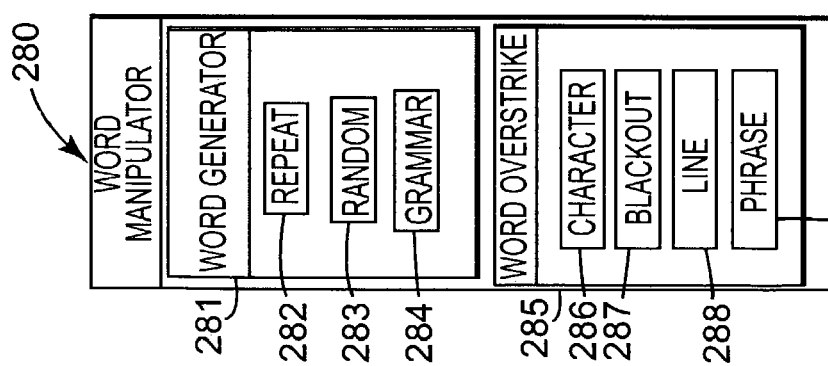
FIG. 8 is block diagram of a word manipulator of an overprint manager of a document obfuscator, according to an embodiment of the present invention.

FIG. 8 illustrates word manipulator 280 of the present invention, which is one optional component of response selector 120 of overprint manager 56 of document obfuscator 12. Word manipulator 280 is used, along with method 290 of the present invention, to obfuscate printed document 296 (FIG. 9). Word manipulator 280 prevents a reconstruction technique on shredded document particles that uses statistical analyses of natural language character and word groupings to reassemble the shredded particles into the original printed document 296. In particular, word manipulator 280 overprints printed document 296 with one or more misleading character and word groupings, blackouts, and overstrikes, in a manner to interrupt the reassembler's analysis of natural language character and word groupings from the shredded particles.

As shown in FIG. 8, word manipulator 280 includes word generator 281 and word overstrike module 285. Word generator 281 includes repeat function 282, random function 283, and grammar function 284. Word generator 281 uses image file(s) 92 and/or electronic text file(s) 94 to identify content of printed document 296 by examining natural language word groupings within printed document 296. Word generator 281 then selects a combination of words unrelated to the identified content (i.e., content-free words) for overprinting on printed document 296. Word generator 281 arranges overprinting that will repeat selected words as well as overprint randomly selected and randomly placed words, using repeat function 282 and random function 283, respectively. Word generator 281 also optionally overprints words in grammatically correct or grammatically incorrect order, via grammar function 284.

Word overstrike module 285 includes character function 286, blackout function 287, line function 288, and phrase function 289. Word overstrike module 285 uses image file 92 and/or electronic text file 94 to identify the content of printed document 296 by determining natural language word groupings and/or character groupings of printed document 296. Word overstrike module 285 then selects characters to overprint directly on top of one or more characters of selected words within printed document 296, via character function 286. Blackout function 287 allows selectively applying a block of toner or ink over selected characters and/or words of printed document 296. Line function 288 and phrase function 289 permit overstriking characters (via character function 286) over whole lines and/or phrases, respectively, as well as applying blackouts of lines and/or phrases with the assistance of blackout function 287.

As shown in FIG. 9, method 290 of the present invention is directed to obfuscating printed document 296. Method 290 is directed to using image file 92 and/or electronic text file 94 (obtained from scanning printed document 296 with scanner 70) and word manipulator 280 to identify natural language character and/or word groupings in printed document 296, as illustrated at 291, and thereby determine the content of printed document 296. As further illustrated at 292, based upon the identified character/word groupings in printed document 296, method 290 includes overprinting the printed document with one or more of: (1) content-free words that are selected and then randomly printed once or repeatedly; (2) content-free words that are grammatically arranged; (3) over striking characters in their positions within words; and (4) blocking out detected words, phrases, lines, paragraphs. Method 290 optionally includes shredding overprinted document 298, as illustrated at 294.

FIG. 9 illustrates the operation of word manipulator 280 in method 290 on printed document 296. Overprinted document 298 reflects at least four optional arrangements of obfuscating sensitive textual information in overprinted document 298. For example, as shown by indicator I, overprinted document 298 reflects the operation of word generator 281 including random function 282 and repeat function 283, which generates overprinting as content-free words that are randomly selected and printed once (e.g., "document") or that are randomly selected and repeated several times (e.g., "is" "an"). As shown by indicator II, overprinted document 298 reflects operation of grammar function 284 of word generator 281 which generates overprinting as content-free words that are grammatically arranged in whitespace of printed document 296 (e.g., "colorless green ideas sleep furiously"). As marked by indicator III, overprinted document 298 reflects operation of character function 284 of word overstrike module 281 which generates overprinting by overstriking new characters over identified characters in words of printed document 296 to prevent comprehension of words in printed document 296. As marked by indicator IV, selected characters, words, lines, and word phrases, are overprinted with a blackout of toner or ink via blackout function 287 in cooperation with character function 286, line function 288, phrase function 289 to completely obscure the pre-existing, characters, words, lines or word phrases.

Accordingly, word manipulator 280 strategically adds blackouts, character overstrikes, and misinformation using seemingly related words to make reconstruction of printed document 296 after shredding more difficult, and can sufficiently obscure printed document 296 to prevent its comprehension, with or without shredding.

FIG. 10 illustrates random pixel manipulator 300, which is one optional component of response selector 120 of overprint manager 56 of document obfuscator 12. Random pixel manipulator 300 is used, along with method 330 of the present invention, to obfuscate printed document 336 (FIG. 11).

Random pixel manipulator 300 operates by putting visual noise on printed document 336 with spots, blotches, etc. of ink or toner having varying shapes, sizes, colors, intensities, to camouflage the original text or images of printed document 336.

As shown in FIG. 10, random pixel manipulator 300 includes individual pixel module 301 and pixel cluster module 308. Individual pixel module 301 directs printing mechanism 50 of document obfuscator 12 (FIG. 2) to randomly print individual pixels of ink onto printed document 336. Using color function 304, printing mechanism 50 randomly prints pixels, which can be all the same color or any one of a plurality of colors, onto printed document 336 (FIG. 11). Location function 302 is used to randomly or selectively determine the areas of printed document 336 that will receive random pixel printing. Finally, fade function 306 controls the intensity of each pixel printing so that various levels of shading of pixels are printed, along with optionally fading of the intensity of pixel printing from one area of printed document 336 to another.

Pixel cluster module 308 of random manipulator 300 generates clusters or groupings of pixels overprinted via printing mechanism 50 on printed document 336. Pixel cluster module 308 includes shape function 310, size function 311, location function 312, color function 313, fade function 314, linear function 315, fractal function 316, random function 317, repeat function 318, predefined function 320 and border function 322. Shape function 310 determines the shape of each pixel cluster while size function 311 determines the size of each pixel cluster. Location function 312 generates a location on printed document 336 for each pixel cluster, while color function 313 generates a color (red, green, blue, etc., as well as black, gray) for each pixel cluster. In addition, color function 313 optionally permits each pixel within a cluster to be a different color or different grayscale shade of gray. Fade function 314 generates different intensity levels of color or grayscale across the pixel cluster.

Linear function 315 generates pixel clusters having shapes according to linear geometric functions, while fractal function 316 generates pixel clusters having shapes according to non-linear geometric functions, such as fractals. Random function 317 can be applied in combination with any other function of pixel cluster module 308 to cause those functions to operate randomly. Repeat function 318 determines whether a pixel cluster of a certain shape, size, etc. will be printed repeatedly about printed document 336, or whether only non-repeating pixel clusters will be printed about printed document 336.

Predefined function 320 uses predefined pixel clusters stored in array 86 of memory 52, which have a preselected shape, size, color, etc. and then randomly or selectively prints them about printed document 336.

Border function 322 generates a characteristic of the border of each pixel cluster that can be frayed, smooth, jagged, etc.

As shown in FIG. 11, method 330 of the present invention is directed to obfuscating printed document 336 using random pixel overprinting. As illustrated at 332, method 330 optionally includes, using image file 92 and/or electronic text file 94 (obtained from a scanned printed document 14) and random manipulator 300 to identify any symbol/word patterns or character patterns in printed documents. Image file 92 and/or electronic text file 94 are used to direct pixel printing to locations on printed document 336 that have information to be obscured. However, scanning printed document 336 is optionally omitted, so that overprinting is carried out independent of the content or patterns of ink/toner on printed document 336.

As illustrated at 333, method 330 includes overprinting printed document 336 with random individual pixels and/or randomly defined pixel clusters. Pixel clusters optionally include randomly selected color pixels, randomly shaped pixels, randomly faded pixels, randomly defined borders of the pixel clusters, repeating patterns of pixels, non-repeating patterns of pixels, linear geometrically-shaped pixel clusters, non-linear geometrically shaped pixel clusters, and randomly selected locations of pixel clusters. As illustrated at 334, method 330 optionally includes shredding the overprinted document.

FIG. 11 illustrates operation of random manipulator 300 of document obfuscator 12 in method 330 on printed document 336 to yield overprinted document 338. As shown by indicator I, overprinted document 338 reflects operation of individual pixel module 301 which generates overprinting as a pattern of randomly overprinted individual pixels. As marked by indicator II, overprinted document 338 reflects operation of pixel cluster module 308, which generates a plurality of randomly defined patterns of pixel clusters.

While overprinting by individual pixels or pixel clusters via random pixel manipulator 300 effectively obscures the content of printed document 336, shredding overprinted document 338 further prevents comprehension of printed document 336 by making that document virtually unrecoverable.

FIG. 12 illustrates image manipulator 340, which is one optional component of response selector 120 of overprint manager 56 of document obfuscator 12. Image manipulator 340 is used, along with method 400 of the present invention, to obfuscate printed document 410 (FIG. 13). Image manipulator 340 operates to alter perception of images seen on printed document 410 by either adding another image onto the existing image or adding a blackout out pattern onto the existing image.

As shown in FIG. 12, image manipulator 340 includes pattern recognizer 341 and image selector 360. Pattern recognizer 341 includes shape function 342, border function 346, color function 344, and fade function 348. Pattern recognizer 341 uses image file 92 and/or electronic text file 94 (obtained from scanner 70) of printed document 410 to identify shapes, colors, border and fade of images and graphics on printed document 41 via shape function 342, color function 344, border function 346, and fade function 348, respectively. Identified images and graphics are used by image selector 360 to determine an overprint response.

Image selector module 360 includes a mirror function 362, complementary function 364, flipped function 366, negative function 368, scramble function 370, rotate function 372, grid function 374, hatch function 376, and blackout function 378. Image selector 360 acts in response to the identified images and graphics of printed document 410 and then overprints a new image, graphic, or pattern over the identified image/graphic using functions 362-378 of image selector 360.

FIG. 13 illustrates method 400 of the present intention for obfuscating a printed document by image confusion using image manipulator 340 of document obfuscator 12. Method 400 includes using image file 92 from scanned printed document to identify images and or graphics on the printed document (as illustrated at 402). Method 400 further includes, as illustrated at 404, assessing the identify images and/or graphics and overprinting printed document with one or more of: (1) a blackout pattern of ink/toner within a regular or irregular shape; and (2) a new image pattern of inks/toner with one or more image parameters including a mirror image, a complementary image, a flipped image, a negative image, a scrambled image, a rotated image, a grid image, and a hatch overlay. As illustrated at 406, overprinted document is optionally shredded to further prevent comprehension of printed document.

As also illustrated FIG. 13, printed document 410 is obfuscated by image manipulator 340 of document obfuscator 12 in method 400 to yield overprinted document(s) 420,430. Printed document 410 includes alphanumeric character groupings 414 and image or graphics 412. Overprinted document 420 includes original character groupings 414 and original image 412, as well as confusing image 422 which is overlaid on top of original image 412 to produce a new combined image of new image 422 and original image 412 that prevents comprehension of original image 412. In this example, flipped image function 366 is used to generate a flipped image of identified image that is overprinted onto image 412 of printed document 410.

Alternatively, overprinted document 430 includes original character groupings 414, original image 412, as well as overprinted blackout image 432 generated by blackout function 378, which completely or partially obscures original image 412 to prevent comprehension of original image 412.

A method and system of the present invention is directed to obfuscating printed documents by printing ink or toner over an existing document to yield an overprinted document, which is then optionally shredded. Various methods are employed during overprinting to obscure the contents and/or pattern of the original printed document and to consequently make reconstructing a shredded document more difficult.

What is claimed is:

1. A method of preventing comprehension of a printed document, the method comprising:

feeding a printed document into a device having a printing mechanism;

scanning the printed document to produce at least one of an image file or an electronic text file of the printed document;

identifying, based upon the image file, at least one target portion of the printed document via determining a first text pattern of symbols in the image file of the printed document, the first pattern of symbols including a line spacing, a paragraph spacing, and a margin spacing of the printed document, wherein the symbols of the first pattern include at least one of characters or numerals;

printing, via the printing mechanism, at least one obfuscation pattern onto the at least one target portion of the printed document via:

building the at least one obfuscation pattern as a second pattern of symbols configured to surround the first pattern of symbols to prevent comprehension of the first pattern of symbols of the printed document, wherein the second pattern of symbols is configured to occupy the line spacing between adjacent lines of the first pattern of symbols, to occupy the paragraph spacing between adjacent paragraphs of the first pattern of symbols, and to occupy the margin spacing of the first pattern of symbols; and printing the second pattern of symbols on the printed document relative to the first pattern of symbols to prevent comprehension of the printed document;

shredding the printed document after printing the at least one obfuscation pattern onto the printed document; and preventing reconstruction of the shredded printed document via the at least one obfuscation pattern.

2. The method of claim 1 wherein the at least one obfuscation pattern comprises two or more different obfuscation patterns.

3. A method of preventing comprehension of a printed document, the method comprising:
- feeding a printed document into a device having a printing mechanism;
- scanning the printed document to produce at least one of an image file or an electronic text file of the printed document;
- identifying based upon the image file or the electronic text file, at least one target portion of the printed document, wherein the at least one target portion comprises a whitespace portion of the printed document; printing via the printing mechanism. at least one obfuscation pattern onto the at least one target portion, to prevent comprehension of the printed document, via at least one of:
  - selecting a negative image of at least one identified character of the printed document and printing the negative image about the at least one identified character of the printed document to produce a substantially uniform thickness of ink or toner for the combination of the at least one identified character and the negative image of the at least one identified character on the printed document, wherein the whitespace portion comprises an area surrounding the at least one identified character and defined by the printed negative image of the identified character;
  - randomly selecting characters and printing strings of the selected characters at randomly selected angles on the printed document; and
  - randomly selecting characters and printing the selected characters individually at angles rotated relative to existing characters of the printed document shredding the printed document after printing the at least one obfuscation pattern onto the printed document: and
- preventing reconstruction of the shredded printed document via the at least one obfuscation pattern.

4. The method of claim 3 wherein printing the at least one obfuscation pattern comprises printing at least one character that complementarily obscures an identified character of the at least one target portion of the printed document and printing the at least one character as an overstrike onto the identified character of the printed document.

5. The method of claim 3 wherein the at least one obfuscation pattern comprises two or more different obfuscation patterns.

6. A method of preventing comprehension of a printed document, the method comprising:
- feeding a printed document into a device having a printing mechanism;
- scanning the printed document to produce at least one of an image file or an electronic text file of the printed document;
- identifying, based upon the one image file or the electronic text file, at least one target portion of the printed document, wherein the at least one target portion includes at least one whitespace portion of the printed document;
- analyzing the electronic text file to determine a content of the printed document;
- printing, via the printing mechanism, at least one obfuscation pattern onto the at least one target portion to prevent comprehension of the printed document via at least one of:
  - randomly selecting a plurality of content-free words and printing the selected words in a non-grammatical order as the at least one obfuscation pattern in the at least one whitespace portion of the printed document with the selected words printed in at least one of a repeating pattern and a non-repeating pattern; and
  - selecting a plurality of content-free words and printing the selected words in a grammatical order as the at least one obfuscation pattern in at least one whitespace portion of the printed document;
  - shredding the printed document after printing the at least one obfuscation pattern onto the printed document: and
- preventing reconstruction of the shredded printed document via the at least one obfuscation pattern.

7. The method of claim 6 wherein the at least one obfuscation pattern comprises two or more different obfuscation patterns.

8. A computer readable medium having computer-executable instructions for performing a method of obfuscating a printed document, the method comprising:
- identifying at least one whitespace portion, at least one text portion, and at least one graphics portion of a printed document; and
- manipulating at least one of a symbol pattern, a character pattern, a word pattern, a random pixel pattern, and an image pattern configured for over-printing onto the respective whitespace portion, the text portion, and the graphics portion of the printed document to prevent reconstruction of the over-printed document after shredding of the over-printed document wherein;
  - manipulating the symbol pattern includes selecting a second pattern of symbol misinformation that confuses a first pattern of symbols of the printed document:
  - manipulating the character pattern includes selecting a plurality of characters for overprinting onto the at least one whitespace portion and the at least one text portion of the printed document;
  - manipulating the word pattern includes selecting a plurality of words, blackouts, and overstrike characters for overprinting onto the at least one whitespace portion and the at least one text portion to obfuscate natural language word groupings of the text portion of the printed document:
  - manipulating the pixel pattern includes selecting at least one of a plurality of individual pixels and a plurality of pixel clusters for overprinting onto the printed document; and
  - manipulating the image pattern includes selecting at least one of a blackout pattern and a confusing image pattern for overprinting onto the at least one graphic portion of the printed document to obfuscate the printed document.

* * * * *

UNITED STATES PATENT AND TRADEMARK OFFICE
CERTIFICATE OF CORRECTION

| | | |
|---|---|---|
| PATENT NO. | : 7,456,983 B2 | |
| APPLICATION NO. | : 10/612598 | |
| DATED | : November 25, 2008 | |
| INVENTOR(S) | : Jack L. Meador et al. | |

It is certified that error appears in the above-identified patent and that said Letters Patent is hereby corrected as shown below:

In column 8, line 63, delete "m" and insert -- III --, therefor.

In column 15, line 11, in Claim 3, delete "identifying" and insert -- identifying, --, therefor.

In column 15, line 14, in Claim 3, delete "printing" and insert -- printing, --, therefor.

In column 15, line 15, in Claim 3, delete "mechanism." and insert -- mechanism, --, therefor.

In column 15, line 34, in Claim 3, delete "document" and insert -- document; --, therefor.

In column 15, line 36, in Claim 3, delete "document:" and insert -- document; --, therefor.

In column 16, line 16, in Claim 6, delete "document:" and insert -- document; --, therefor.

In column 16, line 35, in Claim 8, delete "document wherein;" and insert -- document, wherein: --, therefor.

In column 16, lines 38-39, in Claim 8, delete "document:" and insert -- document; --, therefor.

UNITED STATES PATENT AND TRADEMARK OFFICE
CERTIFICATE OF CORRECTION

PATENT NO. : 7,456,983 B2
APPLICATION NO. : 10/612598
DATED : November 25, 2008
INVENTOR(S) : Jack L. Meador et al.

It is certified that error appears in the above-identified patent and that said Letters Patent is hereby corrected as shown below:

In column 16, line 49, in Claim 8, delete "document:" and insert -- document; --, therefor.

Signed and Sealed this

Fourteenth Day of April, 2009

JOHN DOLL
*Acting Director of the United States Patent and Trademark Office*